United States Patent
Dejean et al.

(10) Patent No.: US 8,340,425 B2
(45) Date of Patent: Dec. 25, 2012

(54) OPTICAL CHARACTER RECOGNITION WITH TWO-PASS ZONING

(75) Inventors: Herve Dejean, Grenoble (FR); Jean-Luc Meunier, St Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 343 days.

(21) Appl. No.: 12/853,461

(22) Filed: Aug. 10, 2010

(65) Prior Publication Data
US 2012/0039536 A1  Feb. 16, 2012

(51) Int. Cl.
*G06K 9/34* (2006.01)
(52) U.S. Cl. .......... 382/176; 382/173; 382/321
(58) Field of Classification Search .......... 382/176, 382/173, 209, 291, 319, 321; 235/375, 487; 707/E17, 999.003; 348/E5.05; 280/738, 280/740; 1/1
See application file for complete search history.

(56) References Cited

U.S. PATENT DOCUMENTS

| | | | |
|---|---|---|---|
| 6,732,090 B2 * | 5/2004 | Shanahan et al. | 1/1 |
| 7,050,630 B2 * | 5/2006 | Simske et al. | 382/176 |
| 7,392,473 B2 | 6/2008 | Meunier | |
| 8,000,529 B2 * | 8/2011 | Chao et al. | 382/176 |
| 2006/0155703 A1 | 7/2006 | Dejean et al. | |
| 2006/0156226 A1 | 7/2006 | Dejean et al. | |
| 2007/0055933 A1 | 3/2007 | Dejean et al. | |
| 2007/0133874 A1 | 6/2007 | Bressan et al. | |
| 2007/0198912 A1 | 8/2007 | Meunier | |
| 2008/0065671 A1 | 3/2008 | Dejean et al. | |
| 2008/0077847 A1 | 3/2008 | Dejean | |
| 2008/0114757 A1 | 5/2008 | Dejean et al. | |
| 2009/0046918 A1 | 2/2009 | Dejean | |
| 2009/0110268 A1 | 4/2009 | Dejean et al. | |
| 2009/0192956 A1 | 7/2009 | Dejean et al. | |

* cited by examiner

*Primary Examiner* — Anh Hong Do
(74) *Attorney, Agent, or Firm* — Fay Sharpe LLP (57) ABSTRACT

An image of a paginated document is zoned to identify text zones. First-pass character recognition is performed on the text zones to generate textual content corresponding to the paginated document. The image of the paginated document is re-zoned based on the textual content to identify one or more new text zones. Second-pass character recognition is performed on at least the new text zones to generate updated textual content corresponding to the paginated document.

24 Claims, 4 Drawing Sheets

FIG. 1

Fig. 1 - The Basic Widget

OPTICAL CHARACTER RECOGNITION WITH TWO-PASS ZONING

BACKGROUND

The following relates to the optical character recognition (OCR) arts.

Optical character recognition (OCR) refers to the use of image processing to identify and extract textual content from an image. In a typical OCR processing sequence, the image is generated by optically scanning a printed page (hence the conventional term "optical" character recognition), the scanned image is analyzed to identify blocks or "zones" which are classified as text zones or non-text zones (for example, images), the text zones are rotated to align the text with the "horizontal", and suitable pattern matching techniques are employed to match and identify images of letters, digits, or other textual characters.

Existing OCR techniques have a high recognition rate for typed text employing a Latin or Latin-derived alphabet. The OCR accuracy generally decreases for other character sets, and for handwritten text, and OCR accuracy may also depend on font type, font size, or other text characteristics, optical scan quality, and other factors. In a favorable setting (good image quality, Latin alphabet, et cetera) OCR recognition rates of order 99% or higher are achieved using existing OCR systems. Nonetheless, further improvement in OCR recognition would be advantageous.

One approach for improving the OCR recognition is to employ a dictionary or lexicon to perform spell correction. These approaches can be beneficial, but the improvement is dependent on the comprehensiveness of the dictionary or lexicon, and in some instances spell correction can actually introduce errors (for example, by "correcting" the spelling of a correctly spelled word that is not in the dictionary or lexicon).

The following sets forth improved methods and apparatuses.

BRIEF DESCRIPTION

In some illustrative embodiments disclosed as illustrative examples herein, a method comprises: zoning an image of a paginated document to identify text zones; performing first-pass character recognition on the text zones to generate textual content corresponding to the paginated document; re-zoning the image of the paginated document based on the textual content to identify one or more new text zones; and performing second-pass character recognition on at least the new text zones to generate updated textual content corresponding to the paginated document; wherein the method is performed by a digital processor.

In some illustrative embodiments disclosed as illustrative examples herein, a storage medium stores instructions that are executable by a digital processor to perform a method as set forth in the immediately preceding paragraph.

In some illustrative embodiments disclosed as illustrative examples herein, an apparatus comprises: a character recognition module including a zoning engine that zones an image of a paginated document to identify text zones and an optical character recognition (OCR) engine that performs character recognition on the text zones to generate textual content corresponding to the paginated document; and a re-zoning engine that identifies new text zones not identified by the zoning engine based on the generated textual content and the image of the paginated document and invokes the OCR engine to perform character recognition at least on the identified new text zones to generate updated textual content corresponding to the paginated document; wherein the character recognition module and the re zoning engine are embodied by a digital processing device.

DETAILED DESCRIPTION

In the following, the term "optical character recognition" or the corresponding acronym "OCR" is used to denote the operation of performing image processing on an image to extract textual content from the image. The optical character recognition or OCR disclosed herein is suitably applied to optically scanned images of pages containing text. However, the optical character recognition or OCR disclosed herein is not limited to images generated by optical scanning—for example, the optical character recognition or OCR disclosed herein is also suitably applied to images containing text represented by bitmaps or pixel-based images that are generated by application programs without any optical scanning operation. Accordingly, the term "optical character recognition" as used herein should be construed as character recognition performed as image processing applied to an image, without regard to the source of the image (whether by optical scanning or another source). The term "character recognition" is also sometimes used herein in place of "optical character recognition".

Figure 1:
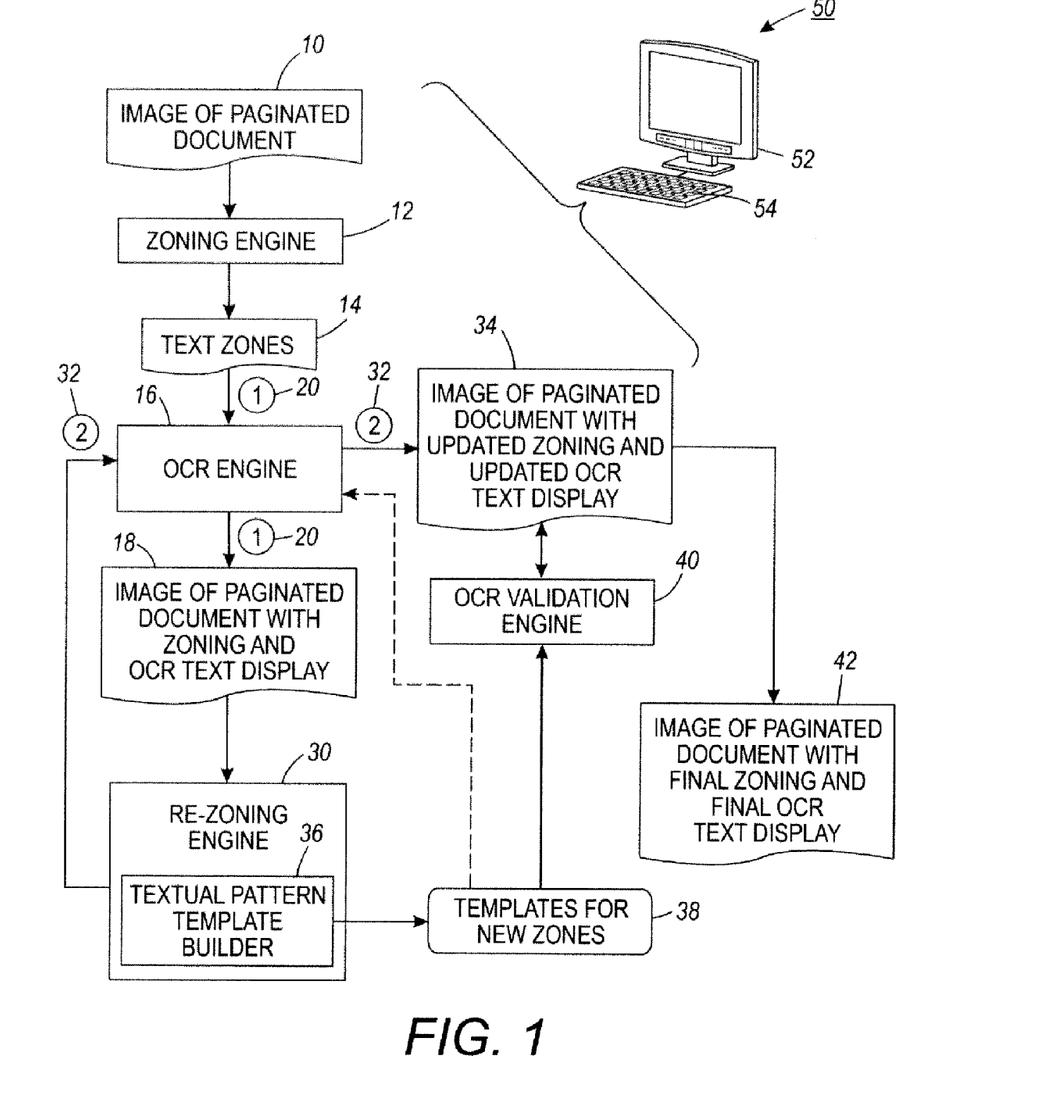
FIG. 1 diagrammatically shows an optical character recognition system including aspects disclosed herein.

With reference to FIG. 1, the input for OCR is suitably an image of a paginated document 10. The image 10 is suitably a bitmapped or pixel image, and may by way of illustrative example be a single paginated portable document format (PDF) file. In another illustrative example, the image of the paginated document 10 may comprise a sequence of image files, for example in JPEG, TIFF, or another image format), in which each image file stores an image of one page of the document and the image files have a defined ordering corresponding to the ordering of the pages.

The inventors have performed OCR on hundreds of such images of paginated documents using various OCR systems, including some commercial OCR systems. With continuing reference to FIG. 1, these OCR systems are suitably represented as a character recognition module 12, 16 including: a zoning engine 12 that zones an image of a paginated document to identify text zones 14; and an optical character recognition (OCR) engine 16 that performs character recognition on the text zones to generate textual content corresponding to the paginated document 10. A suitable output 18 of the character recognition module 12, 16 combines the image of the paginated document 10 with zoning suitably represented by the text zones 14 and the textual content generated by the OCR engine 16 represented as an OCR text overlay.

The zoning engine 12 zones the image 10 to identify at least text zones. Optionally, the zoning engine 12 additionally identifies zones of other types, such as by way of illustrative example, one or more of the following types: image zones; table zones; figure zones; line graphic zones; or so forth. Conventionally, these non-text zones are used to ensure that the OCR is not applied to non-textual content of the paginated document. However, it is additionally disclosed herein that the non-textual zones can be used in identifying a local multiple element configuration comprising a plurality of elements having a defined local positional relationship, where at least one element is a text zone and one or more of the other elements may be non-textual zones.

In performing character recognition using such character recognition modules 12, 16, the inventors have noticed a problem with the zoning operation of these OCR systems, in that the zoning engine 12 has a tendency to fail to detect small text zones, such as text zones corresponding to headers, footers, page numbers, and figure captions. Moreover, even when the zoning engine 12 does identify a small text zone, the character recognition performed by the OCR engine 16 is sometimes less than satisfactory. For example, in the case of page numbers including the digit "1", this digit is sometimes erroneously recognized as the lower-case letter "l", and similarly the digit "0" is sometimes erroneously recognized as the upper case letter "O". Post-OCR spell checking is of little benefit in these instances. Indeed, the inventors have concluded that post-OCR processing in general is unlikely to be helpful due to the lack of surrounding context for small text zones.

Disclosed herein is are approaches for overcoming this difficulty. These approaches employ the OCR engine 16 using two passes. A first pass 20 through the OCR engine 16 operates on the text zones 14 identified by the zoning engine 12 to generate the output 18 including the textual content generated by the first-pass character recognition and the image of the paginated document. This first pass 20 is diagrammatically indicated in FIG. 1 using circled "1" symbols.

After the first pass, the output 18 is analyzed by a re-zoning engine 30 to identify new text zones not identified by the zoning engine 12 based on the generated textual content (including the identified text zones, the textual content itself, or both) of the first-pass 20 and the image of the paginated document 10. The re-zoning engine 30 then invokes the OCR engine 16 to perform a second pass 32 (diagrammatically indicated in FIG. 1 using circled "2" symbols) through the OCR engine 16 in which character recognition is performed at least on the identified new text zones to generate updated textual content corresponding to the paginated document. A suitable output 34 of second pass 30 through the OCR engine 16 combines the image of the paginated document 10 with the updated zoning (including the text zones 14 and the new text zones identified by the re-zoning engine 30) and the updated OCR text overlay including the updated textual content.

The re-zoning engine 30 identifies new zones based on patterns of the textual content in the image of the paginated document 10. For example, one pattern may be the presence of a header in the top margin of the pages, or alternatively or additionally the presence of a footer in the bottom margin of the pages. In such a case, a text zone is expected to be found at the same location in the top (and/or bottom) margin of a plurality of pages having the header (and/or footer), and moreover the textual content of these text zones at the same location on plural pages is expected to be identical, or at least similar (e.g., possibly varying if the header or footer includes a page number or other text portion that may vary from page to page).

Another pattern is an incremental pattern. In the case of page numbers, text zones are found at the same location in a margin of a plurality of pages, and the textual content of those text zones is expected to be incremental in correspondence with the pages. In other cases, such as a table of contents, the pattern is an incremental sequence in the textual content generated by the first pass character recognition, and a new text zone is identified as: (i) a new sequence element text zone that was not identified by the first-pass zoning performed by the zoning engine 12 and (ii) that has a location corresponding to a missing element of the incremental sequence. For example, if the identified incremental sequence is "1, 2, 3, 5, 6, 7" then the new sequence element text zone is expected to have a location that is between the location of the text zone including "3" and the text zone including "5".

In some embodiments, the patterns relied upon to identify new text zones during the rezoning are local patterns. For example, the paginated document may include images (or figures, or tables, or other non-textual elements) having captions located above (or below, or left, or right) of the image (or figure, or table, et cetera). In this case, the pattern is a local multiple element configuration comprising a plurality of elements (e.g., the image and the caption text) having a defined local positional relationship (e.g., above, or below, or left, or right). The local multiple element configuration includes a text zone element, and is repeated multiple times in the image of the paginated document 10. The re-zoning engine 30 suitably identifies a further instance of the local multiple element configuration whose text zone element was not identified by the zoning, and identifies a new text zone as the text zone element of the identified further instance of the local multiple element configuration.

The re-zoning engine 30 identifies new text zones in which character recognition is performed by the OCR engine 16 in the second pass 32. Optionally, the re-zoning engine 30 also includes a textual pattern template builder 36 that builds one or more textual pattern templates 38 for the various types of new text zones. For example, in the case of a header or footer or other repeating text zone, template builder 36 suitably builds the textual pattern template for the repeating text zone based on an aggregation of the textual content generated by the first pass character recognition for the repeating text zone. By way of illustration, if five pages include the following header textual content: "Widgets"; "WIdgets"; "W1gets"; "Widgets"; and "Widgets" then the textual pattern template may be "Widgets" (taking the most prevalent textual content as the pattern) or "W?dgets" (keeping all letters that are common to the repeating text zone in all five pages and using the wildcard "?" to denote a letter that differs amongst the repeating text zone instances of the five pages and hence should be OCR'd).

The optionally generated textual pattern template(s) 38 can be used in various ways. Some embodiments of the OCR engine 16 are designed to use a textual pattern template in performing the character recognition. In such embodiments, the textual pattern template(s) 38 are input to the OCR engine 16 for use in the second pass 32. (This is indicated in FIG. 1 by a dashed line running from the textual pattern template 38 to the OCR engine 16). Additionally or alternatively, some embodiments of the OCR engine 16 are designed to output two or more textual content candidates for an ambiguous word (or more generally, for an ambiguous token). In such cases, an optional OCR validation engine 40 suitably uses the textual pattern template(s) 38 to select the updated textual content from amongst the two or more textual content candidates provided by the OCR engine 16. Even in cases in which the OCR engine 16 outputs a textual content "candidate", the optional OCR validation engine 40 optionally uses the textual pattern template(s) 38 to validate and, if appropriate, correct the textual content "candidate" output by the OCR engine 16.

If the optional OCR validation engine 40 is omitted, then the output 34 of the second pass 32 suitably serves as the final output 42 comprising the image of the paginated document 10 with the final zoning and the final OCR text overlay. Alternatively, if the optional OCR validation engine 40 is included then the final output 42 is the output 34 as further processed by the OCR validation engine 40 (e.g., using the text pattern templates to resolve any textual content ambiguities).

The illustrative apparatus of FIG. 1 including the character recognition module 12, 16 and the rezoning engine 30 and the optional OCR validation engine 40 is suitably embodied by a digital processing device comprising a digital processor (not shown, but which may include a multiple-core digital processor, a operative parallel arrangement of multiple processors, or so forth). In illustrative FIG. 1, a suitable digital processing device in the form of an illustrated computer 50 is shown, which includes a display 52 and a keyboard 54 (additionally or alternatively, other user interfacing devices can be included, such as a mouse or other pointing device by way of example). In other embodiments, the digital processing device may be a personal data assistant (PDA), a cellular telephone (cell phone) with digital data processing capability, a slate-type computing device, an electronic reading device (e-reader), or so forth.

The character recognition approaches disclosed herein may also be embodied as a storage medium storing instructions that are executable by a digital processor to perform a method as disclosed herein with reference to FIG. 1. The storage medium may, by way of illustrative example, include one or more of: a hard disk drive or other magnetic storage medium; an optical disk or other optical storage medium; a FLASH memory, random access memory (RAM), read-only memory (ROM), electronically erasable programmable read-only memory (EEPROM), or other electronic storage medium; various combinations of the foregoing; or so forth.

Further aspects of the character recognition techniques disclosed herein and described with reference to FIG. 1 are set forth below.

In general, the disclosed techniques entail performing OCR on each page of the image of the paginated document 10 as per the first pass 20. The re-zoning engine 30 is then applied to recognize logical structures or patterns in the image of the paginated document 10, the recognizing being informed by the textual content (including the text zones identified by the zoning engine 12) generated by the first pass 20, so as to generate new text zones for OCR processing in the second pass 32. The recognition of logical structures or patterns entails applying the unsupervised or supervised methods for recognizing certain logical structures or patterns. In some illustrative embodiments set forth herein, the logical structures or patterns include: page headers and/or footers, page numbers, enumerated patterns, captions, table of contents and associated titles. Supervised methods can also be employed, for example to recognize domain-specific elements such as tool codes in technical automotive manuals.

The recognition of the new text zones involves building geometrical templates or models for component elements of the logical structures or patterns, and is tailored for each type of structure or pattern. Some illustrative cases include: (1) a case where the logical structure occurs at most once in a page, in which case the geometrical template is based in the regular (that is, same) position of the structure on each of a plurality of pages; (2) a case where the logical structure occurs several times in a page, in which case a geometrical template is generated if the structures share positional regularities regarding the vertical or horizontal axes; and (3) a case where two logical structures co-occur locally with positional regularities, in which case a template is created for each structure relatively to the other. Some more specific illustrative examples are set forth in the following.

An example of case (1) is the case of a header or a footer. Given the textual content extracted by the first character recognition pass 30, various approaches are known for identifying text zones at the top (or bottom) that repeat over a plurality of pages and for which repetitions the text variability is low or nonexistent. Some suitable approaches are disclosed, by way of illustrative example, in Déjean et al., U.S. Pub. No. 2006/0156226 A1, titled "Method and apparatus for detecting pagination constructs including a header and a footer in legacy documents", published Jul. 13, 2006, which is incorporated herein by reference in its entirety. The identified header and/or footer text zones enable defining a template for each set of (i.e., plurality of) contiguous (or substantially contiguous 0 pages in a document that share the common header or footer. The template suitably indicates the bounding box of one or more header and/or footer text zones which repeat on a plurality of pages, and in which a page header or footer possibly appears.

Another example of case (1) is the case of page numbers. Here the goal is to associate a logical page number to each physical page of the paginated document, and to determine a text zone which appears at the same location on a plurality of pages at which text zone the page number is likely to be located. In some documents, the numbering sequence may change for different parts or sections of the paginated document. For example, a document may have a preface section whose pages are enumerated using lower-case Roman numerals (i, ii, iii, iv, . . . ) followed by a main text whose pages are enumerated using Arabic numerals (1, 2, 3, 4, . . . ). A different text zone may be determined for each such numbering sequence (each of which will occupy a different plurality of pages). Some suitable approaches for detecting the page numbers and page number text zones are disclosed, by way of illustrative example, in Déjean et al., U.S. Pub. No. 2008/0114757 A1, titled "Versatile page number detector", published May 15, 2008, which is incorporated herein by reference in its entirety.

An example of case (2) is the case of enumerated patterns, such as may occur by way of illustrative example in a table of contents. Here, the goal is to identify elements that are not necessarily occupying a constant/regular position from page to page, but which do form an incremental sequence. For example, in a table of contents the listing of the chapter numbers may form an incremental sequence (e.g., "Chapter 1 . . . ", "Chapter 2 . . . ", . . . ). In such embodiments a model for the incremental sequence is suitably trained or otherwise generated, and is used to recognize any missing elements based on geometric local features. For instance a missing number in a series of enumerated elements with some regular positioning of the numbers relatively to each other can be recognized. Some suitable approaches for detecting components of a table of contents are disclosed, by way of illustrative example, in: Déjean et al., U.S. Pub. No. 2006/0155703 A1, titled "Method and apparatus for detecting a table of contents and reference determination", published Jul. 13, 2006, which is incorporated herein by reference in its entirety; Meunier, U.S. Pub. No. 2007/0198912 A1, titled "Rapid similarity links computation for table of contents determination", published Aug. 23, 2007, which is incorporated herein by reference in its entirety; and Déjean et al., U.S. Pub. No. 2009/0110268 A1, titled "Table of contents extraction based on textual similarity and formal aspects", published Apr. 30, 2009, which is incorporated herein by reference in its entirety. Some suitable approaches for detecting an ordered sequence of identifiers are disclosed, by way of illustrative example, in: Déjean et al., U.S. Pub. No. 2009/0192956 A1, titled "Method and apparatus for structuring documents utilizing recognition of an ordered sequence of identifiers", published Jul. 30, 2009, which is incorporated herein by reference in its entirety.

An example of case (3) is captions for figures, images, or other non-textual objects. When the caption and its image have a fixed relative positional (for example, the caption being above, or below, or to the left of, or to the right of, the captioned image), it is straightforward to build a structural template for the positions of the caption and the captioned object relative to one another. More generally, a local multiple element configuration is identified which comprises a plurality of elements having a defined local positional relationship, including at least one text zone element. Some suitable approaches for detecting captions of objects are disclosed, by way of illustrative example, in Déjean, U.S. Pub. No. 2008/0077847 A1, titled "Captions detector", published Mar. 27, 2008, which is incorporated herein by reference in its entirety.

Another example of case (3) is the case of footnotes. In this case the local multiple element configuration comprises: (i) a body reference mark flagging a point in the main text; and (ii) a footnote preceded by a note reference mark matching the body reference mark. In this example both elements of the local multiple element configuration are text zones. Some suitable approaches for detecting such notes including both the body reference mark and the footnote with its preceding note reference mark are disclosed, by way of illustrative example, in Déjean, U.S. Pub. No. 2009/0046918 A1, titled "Systems and methods for notes detection", published Feb. 19, 2009, which is incorporated herein by reference in its entirety.

After the re-zoning engine 30 identifies the new text zones, it invokes the OCR engine 16 to apply the second character recognition pass 32 at least in the new text zones. Optionally, the OCR engine 16 performs the second pass 32 as a parameterized character recognition according to the textual pattern template for the new text zone that is generated by the textual pattern template builder component 36 of the re-zoning engine 30. There are various ways the OCR engine 16, or the optional downstream OCR validation engine 40, can utilize the information provided by the textual pattern template(s) 38. The choice of approach is suitably governed at least in part by the capabilities of the OCR engine 16 offered through its application program interface (API). In one approach, the new text zone is identified to the OCR engine 16 together with some expectations as to its textual content as expressed by the textual pattern template 38 (as illustrated), or by less specific information such as the type of characters to be expected (e.g. numerical, alphanumerical, or so forth). On the other hand, if the API of the OCR engine 16 is not capable of utilizing the textual pattern template 38 (or other content limiting information), then only the new text zone is identified to the OCR engine 16, and the OCR engine 16 returns one or more textual content candidates for the new text zone from which the OCR validation engine 40 selects one final textual content selection that best matches the textual pattern template 38 (or other content limiting information).

These approaches are not mutually exclusive—for example, the OCR engine 16 can utilize the textual pattern template 38 in performing optical character recognition and the OCR validation engine 40 can also perform a validation of the result based on the textual pattern template 38. For example, if OCR engine 16 outputs a value that does not make sense based on the template 38, then the OCR validation engine 40 suitably discards the output. For instance, if the new text zone is supposed to contains a Roman page number according to the template, but instead the OCR result is a letter, it may be discarded.

The second pass 32 performs character recognition at least on the new text zones identified by the re-zoning engine 30 based on the image of the paginated document 10 and the textual content generated by the first pass 20. Optionally, the second pass 32 may additionally perform character recognition on the "old" text zones that were initially identified by the zoning engine 12 and that were OCR'd in the first pass 20. This latter option may be useful, for example, if the re-zoning engine 30 associates an "old" text zone with one of the textual pattern templates 38 so that the second pass 32 can take advantage of the template 38 in order to perform character recognition of the "old" text zone that may possibly be more accurate than the first pass 20.

Figure 2:
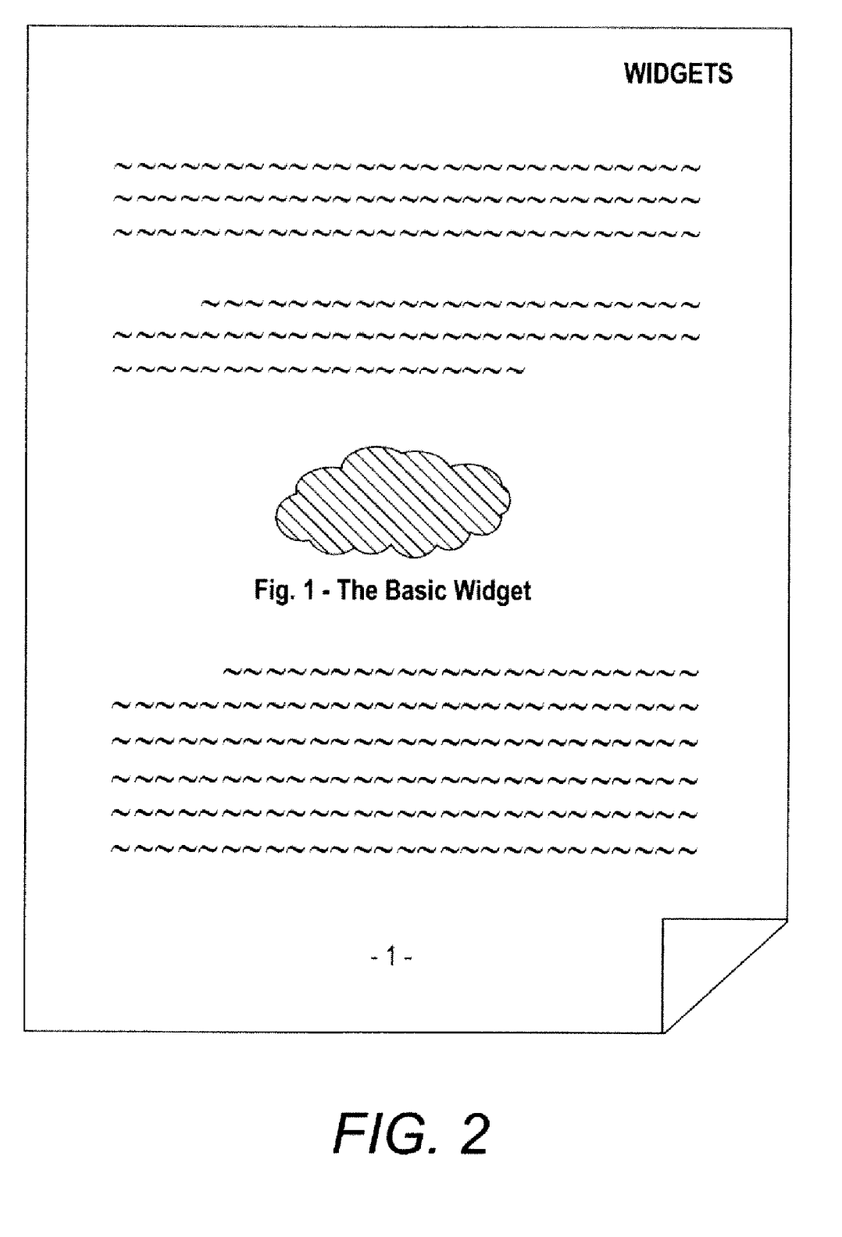
FIGS. 2-4 illustrate an example of zoning and rezoning performed by the system of FIG. 1 in accordance with aspects disclosed herein.
Figure 3:
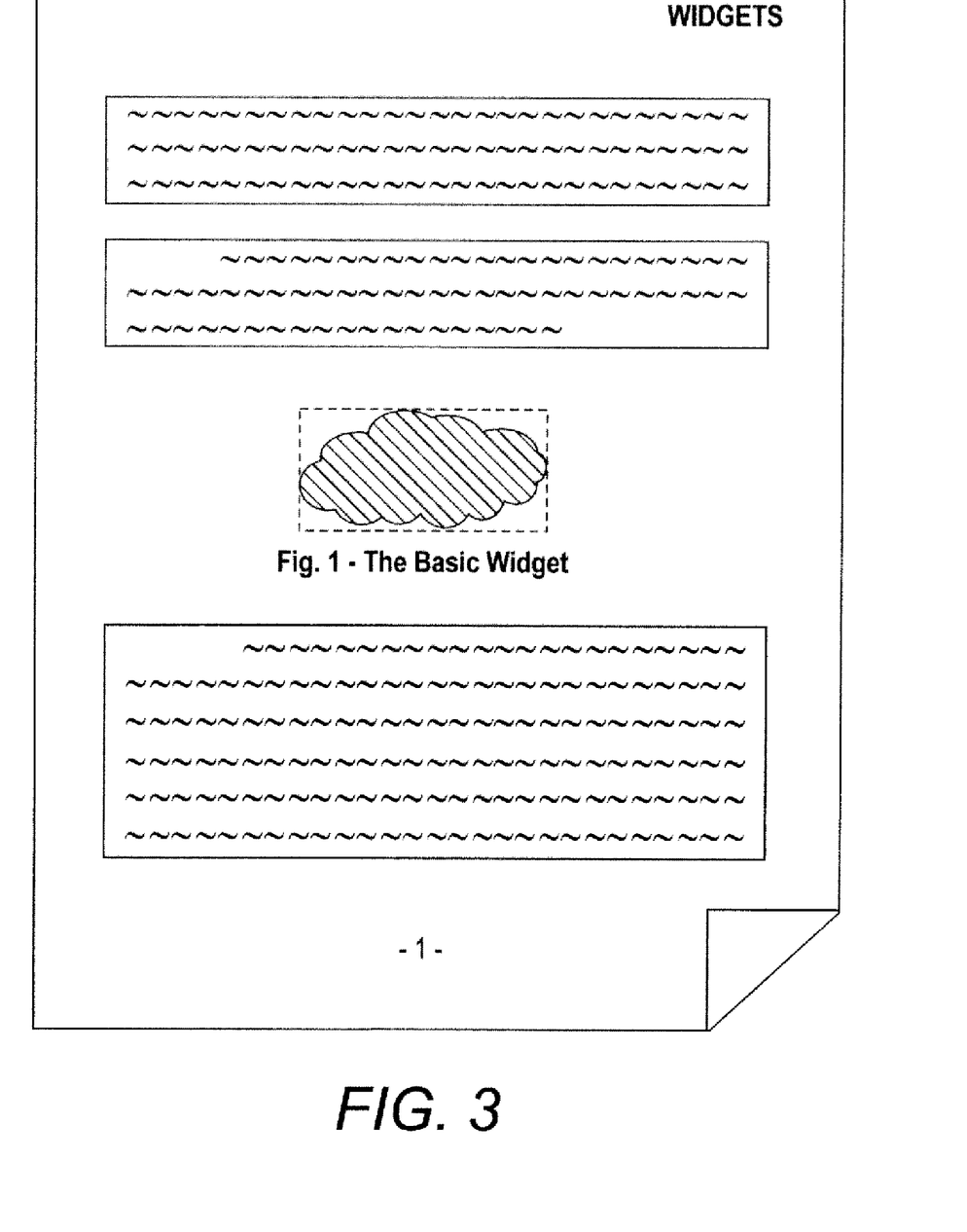
Figure 4:
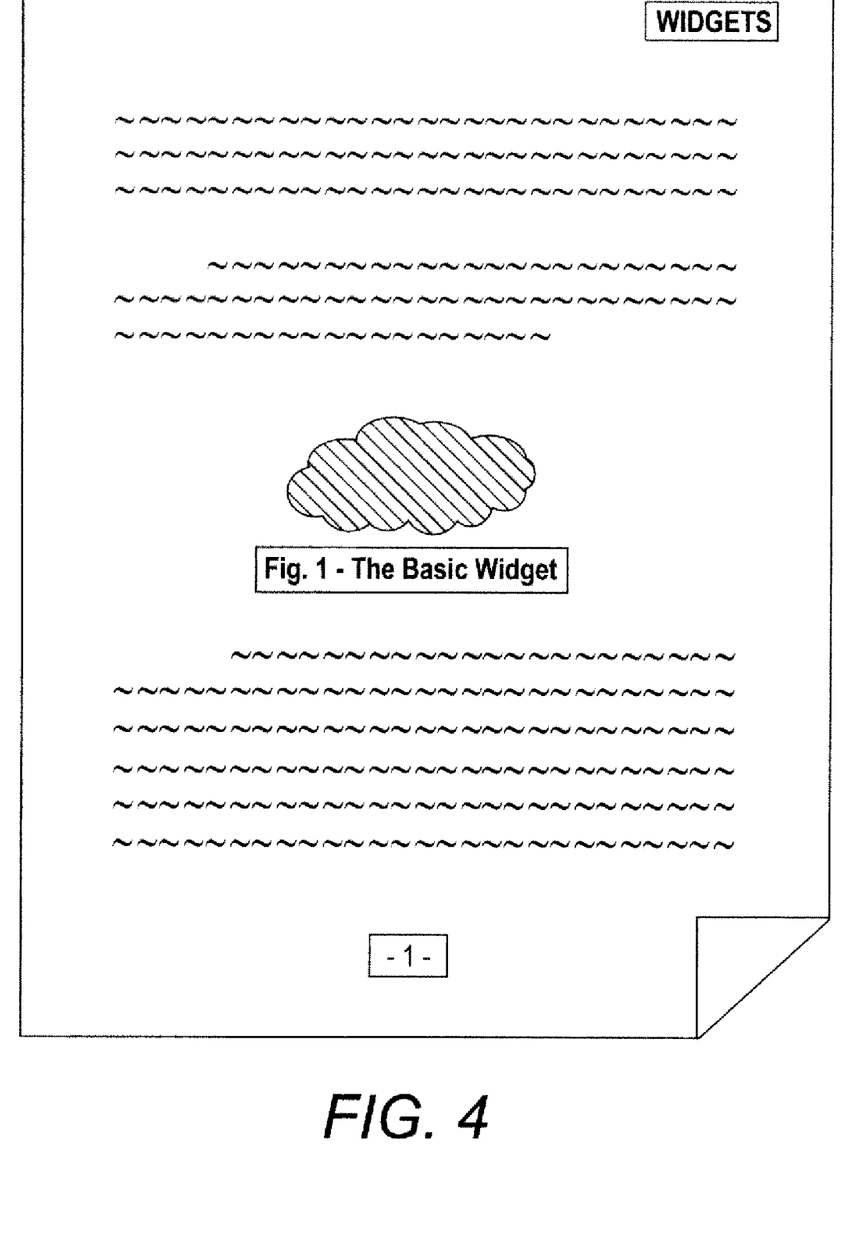

With reference to FIGS. 2-4, an illustrative diagrammatic example of operation of the apparatus of FIG. 1 is set forth. FIG. 2 diagrammatically shows an illustrative image of one page of a paginated document. The page includes a header "Widgets" at the right end of the upper margin, which is to be understood as being repeated at the same upper right-hand marginal location on a plurality of pages (possibly all pages) of the paginated document. The page also includes a page number "—1—" centered in the bottom margin. Again, it is to be understood that an incremental sequence of page numbers appear on a plurality of pages (possibly all pages) of the paginated document, with each page number at the same centered location in the bottom margin. Still further, the page includes an image (diagrammatically represented by a hatched "cloud-like" representation) centered horizontally on the page and having a caption "FIG. 1—The basic widget" centered horizontally below the image. It is to be understood that figures may occur at various points throughout the documents, and that these figures are not necessarily (and, indeed, most likely are not) regularly spaced through the document. However, it is to be further understood that the local multiple element configuration of an image centered horizontally with a caption centered horizontally below the image is expected to recur at various places in the paginated document.

FIG. 3 illustrates the output of the zoning engine 12. The zoning engine 12 has accurately identified three text zones corresponding to three paragraphs on the illustrative page. However, the zoning engine 12 has failed to identify the further text zones corresponding to the header "Widget", the page number "—1—", and the figure caption "FIG. 1—The basic widget". Accordingly, in the first pass 20 the OCR engine 16 will not perform character recognition on these unidentified textual portions. Additionally, although the zoning engine 12 failed to identify the figure caption, it did identify a non-textual (e.g., "image") zone corresponding to the image (diagrammatically represented by a hatched "cloud-like" representation). This image zone is marked in FIG. 3 by a dashed box to distinguish it from the text zones.

FIG. 4 illustrates the output of the re-zoning engine 30 (neglecting any template output by the optional template builder 36). The re-zoning engine 30 identifies a new text zone as a repetition of the repeating header "Widget" on the illustrated page. This identification is made because the re-zoning engine 30 (unlike the zoning engine 12) can take advantage of information provided by the textual content (including original text zones) identified in the first pass 20. This information includes identification of text zones at the same upper righthand margin location as the "Widget" text of the illustrative page on many other pages of the paginated document. Based on this information, the re-zoning engine 30 identifies the new text zone located at the repetition of the repeating header "Widget" on the illustrated page.

As further shown in FIG. 4, the re-zoning engine 30 also identifies a new text zone as an incremental text zone located centered in the bottom margin, corresponding to the page number "—1—". Again, the re-zoning engine 30 takes advantage of information from the textual content output by the first pass 20 that was unavailable to the zoning engine 12 during the first pass 20, namely the information that many pages (although not the page shown in FIG. 3) did identify a text zone centered in the bottom margin.

As still further shown in FIG. 4, the re-zoning engine 30 also identifies a caption text zone corresponding to the caption "FIG. 1—The basic widget". Yet again, the re-zoning engine 30 takes advantage of information from the textual content output by the first pass 20 that was unavailable to the zoning engine 12 during the first pass 20, namely the information that (1) the image zone identified by the zoning engine 12 is present and (2) most image zones in the paginated document have a text zone directly underneath that is centered horizontally on the page and for which the textual content generated by the first pass 20 has certain characteristics such as the leftmost text being "Fig.". The latter information (2) is suitably generated, for example, using the approach of in Déjean, U.S. Pub. No. 2008/0077847 A1, titled "Captions detector", published Mar. 27, 2008, which is incorporated herein by reference in its entirety.

Although not illustrated, it is also contemplated to use the re-zoning engine 30 and the results of the second pass 32, operating on a set of training documents, in order to train the character recognition module 12, 16. This approach is useful when the OCR engine 16 is configured for tuning or optimization respective to a training set of documents, which is the case for some commercial OCR systems. In this case the training data set is selected and processed in the first pass 20 as previously described. The re-zoning engine 30 is applied to identify any portions of the output 18 that are not compliant with "model" generated by the re-zoning engine 30 (including any optionally generated textual pattern templates 38) and to select the "right" value (for example, by performing the second pass 32 to generate improved output 42), which then serves as the "correct" annotations for training of single-pass operation of the optical character recognition module 12, 16.

This approach provides an automatic method for providing the OCR with a template that will guide the character recognition at the cost of a second (but partial and template-guided) OCR step. The template can be global (i.e. for all pages) or local (for some pages, or one page) and it is established by a method that takes into account the whole document. Thus, this is an adaptive method for generating OCR templates.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
zoning an image of a paginated document to identify text zones;
performing first-pass character recognition on the text zones to generate textual content corresponding to the paginated document;
re-zoning the image of the paginated document based on the textual content to identify one or more new text zones; and
performing second-pass character recognition on at least the new text zones to generate updated textual content corresponding to the paginated document;
wherein the method is performed by a digital processor.

2. The method as set forth in claim 1, further comprising:
generating a document comprising the image of the paginated document and a textual overlay comprising the updated textual content.

3. The method as set forth in claim 1, wherein the re-zoning comprises:
identifying a repeating text zone that is repeated at a same location on a plurality of pages; and
identifying a new text zone as a repetition of the repeating text zone at the same location on a page other than the plurality of pages that was not identified by the zoning.

4. The method as set forth in claim 3, wherein the identifying of a repeating text zone comprises:
identifying a repeating header or footer text zone based on (1) repetition of the repeating header or footer text zone at a same location in an upper or lower margin of a plurality of pages and (2) similarity or identity of textual content generated by the first-pass character recognition for the repeating header or footer text zone on the plurality of pages.

5. The method as set forth in claim 3, further comprising:
generating a textual pattern template for the repeating text zone based on an aggregation of the textual content generated by the first-pass character recognition for the repeating text zone.

6. The method as set forth in claim 5, wherein the performing of second-pass character recognition comprises:
performing second-pass character recognition on the new text zone identified as a repetition of the repeating text zone using the textual pattern template.

7. The method as set forth in claim 5, wherein the second-pass character recognition generates a plurality of textual content candidates for the new text zone identified as a repetition of the repeating text zone, and the method further comprises:
selecting textual content for the new text zone identified as a repetition of the repeating text zone from the generated plurality of textual content candidates based on the textual pattern template.

8. The method as set forth in claim 1, wherein the re-zoning comprises:
identifying an incrementing text zone having a same location on a plurality of pages and for which at least a portion of the textual content generated by the first-pass character recognition increments from page to page; and
identifying a new text zone as an instance of the incrementing text zone at the same location on a page other than the plurality of pages, the new text zone not having been identified by the zoning.

9. The method as set forth in claim 8, wherein the identifying of an incrementing text zone comprises:
identifying an incrementing page number text zone based on (1) the incrementing page number text zone having a same location in an upper or lower margin of a plurality of pages and (2) at least a portion of the textual content generated by the first-pass character recognition for the incrementing page number text zone incrementing in correspondence with pages of the plurality of pages.

10. The method as set forth in claim 8, further comprising:
generating a textual pattern template for the incrementing text zone including an incremental pattern portion.

11. The method as set forth in claim 10, wherein the performing of second-pass character recognition comprises:
performing second-pass character recognition on the new text zone identified as an instance of the incrementing text zone using the textual pattern template.

12. The method as set forth in claim 10, wherein the second-pass character recognition generates a plurality of textual content candidates for the new text zone identified as an instance of the incrementing text zone, and the method further comprises:
selecting textual content for the new text zone identified as an instance of the incrementing text zone from the generated plurality of textual content candidates based on the textual pattern template.

13. The method as set forth in claim 1, wherein the re-zoning comprises:

identifying an incremental sequence in the textual content generated by the first-pass character recognition; and identifying a new sequence element text zone that was not identified by the zoning and that has a location corresponding to a missing element of the incremental sequence.

14. The method as set forth in claim 13, further comprising:

generating a textual pattern template for new sequence element text zone based on the missing element of the incremental sequence.

15. The method as set forth in claim 1, wherein the re-zoning comprises:

identifying in the image of the paginated document a local multiple element configuration comprising a plurality of elements having a defined local positional relationship, the local multiple element configuration (i) including a text zone element and (ii) being repeated multiple times in the image of the paginated document;

identifying a further instance of the local multiple element configuration whose text zone element was not identified by the zoning; and identifying a new text zone as the text zone element of the identified further instance of the local multiple element configuration.

16. The method as set forth in claim 15, wherein the local multiple element configuration comprises a non-textual element and a caption text zone element having a defined local positional relationship that is one of above, below, left, or right the non-textual element.

17. The method as set forth in claim 16, further comprising:

generating a textual pattern template for the caption text zone element.

18. The method as set forth in claim 16, wherein the identifying of a local multiple element configuration includes identifying an incremental portion of the caption textual element, and the method further comprises:

generating a textual pattern template for the caption text zone element, the textual pattern template including an incremental template portion corresponding to the incremental portion of the caption textual element.

19. A storage medium storing instructions that are executable by a digital processor to perform a method as set forth in claim 1.

20. An apparatus comprising:

a character recognition module including a zoning engine that zones an image of a paginated document to identify text zones and an optical character recognition (OCR) engine that performs character recognition on the text zones to generate textual content corresponding to the paginated document; and a re-zoning engine that identifies new text zones not identified by the zoning engine based on the generated textual content and the image of the paginated document and invokes the OCR engine to perform character recognition at least on the identified new text zones to generate updated textual content corresponding to the paginated document;

wherein the character recognition module and the re-zoning engine are embodied by a digital processing device.

21. The apparatus as set forth in claim 20, wherein the re-zoning engine (i) identifies a repeating text zone that is repeated at a same location on a plurality of pages and (ii) identifies a new text zone not identified by the zoning engine as a repetition of the repeating text zone at the same location on a page other than the plurality of pages.

22. The apparatus as set forth in claim 20, wherein the re-zoning engine (i) identifies an incrementing text zone having a same location on a plurality of pages and for which at least a portion of the textual content generated by the first-pass character recognition increments from page to page and (ii) identifies a new text zone not identified by the zoning engine as an instance of the incrementing text zone at the same location on a page other than the plurality of pages.

23. The apparatus as set forth in claim 20, wherein the re-zoning engine (i) identifies an incremental sequence in the textual content generated by the first-pass character recognition and (ii) identifies a new sequence element text zone not identified by the zoning engine that has a location corresponding to a missing element of the incremental sequence.

24. The apparatus as set forth in claim 20, wherein the re-zoning engine (i) identifies in the image of the paginated document a local multiple element configuration comprising a plurality of elements having a defined local positional relationship in which the local multiple element configuration includes a text zone element and is repeated multiple times in the image of the paginated document and (ii) identifies a further instance of the local multiple element configuration whose text zone element was not identified by the zoning and (iii) identifies a new text zone as the text zone element of the identified further instance of the local multiple element configuration.

\* \* \* \* \*